United States Patent [19]

Lagnemo et al.

[11] Patent Number: 6,071,431
[45] Date of Patent: *Jun. 6, 2000

[54] BLEACHING AGENT

[75] Inventors: Hans Lagnemo, Göteborg; Monica Jigstam, Torslanda, both of Sweden

[73] Assignee: EKA Chemicals AB, Bohus, Sweden

[ * ] Notice: This patent issued on a continued prosecution application filed under 37 CFR 1.53(d), and is subject to the twenty year patent term provisions of 35 U.S.C. 154(a)(2).

[21] Appl. No.: 08/817,462

[22] PCT Filed: Aug. 24, 1995

[86] PCT No.: PCT/SE95/00960

§ 371 Date: Mar. 18, 1997

§ 102(e) Date: Mar. 18, 1997

[87] PCT Pub. No.: WO96/11253

PCT Pub. Date: Apr. 18, 1996

[30] Foreign Application Priority Data

Oct. 7, 1994 [WO] WIPO ............... PCT/SE94/00943
Nov. 3, 1994 [SE] Sweden ............... 9403778

[51] Int. Cl.$^7$ ............ C01B 15/00; C01B 15/04; C01B 15/055; C11D 3/39

[52] U.S. Cl. ............ 252/186.25; 252/186.26; 252/186.27; 252/186.31; 510/309; 510/310; 510/315

[58] Field of Search ............ 252/186.25, 186.26, 252/186.27, 186.31; 8/111; 510/309, 310, 315

[56] References Cited

U.S. PATENT DOCUMENTS 3,883,640  5/1975  Smart .................... 423/415.1
3,917,663  11/1975  Kegelart et al. ............ 423/415.2
3,975,280  8/1976  Hachmann et al. ............ 252/186.31
3,977,988  8/1976  Tokiwa et al. ............ 510/375
4,075,116  2/1978  Mesaros ............ 510/375
4,428,914  1/1984  Brichard et al. ............ 423/265
4,973,730  11/1990  Baur et al. ............ 558/372
4,997,587  3/1991  Baur et al. ............ 510/316
5,019,296  5/1991  Baur et al. ............ 510/480
5,082,599  1/1992  Oftring et al. ............ 562/568
5,254,290  10/1993  Blandiaux et al. ............ 510/417
5,346,680  9/1994  Roesler et al. ............ 423/274
5,362,412  11/1994  Hartman et al. ............ 252/186.25
5,462,804  10/1995  Kokubu et al. ............ 428/402.24
5,703,031  12/1997  Trani et al. ............ 510/312

FOREIGN PATENT DOCUMENTS 0407045  1/1991  European Pat. Off. ............ 15/10
0459625  12/1991  European Pat. Off. ............ 15/10
0546815  6/1993  European Pat. Off. ............ 15/10
0573731  12/1993  European Pat. Off. .
60-011210  1/1985  Japan .
659082  12/1986  Switzerland ............ 7/4
1466799  3/1977  United Kingdom .
1538893  1/1979  United Kingdom .
1575792  10/1980  United Kingdom .

*Primary Examiner*—Joseph D. Anthony
*Attorney, Agent, or Firm*—David J. Serbin

[57] ABSTRACT

The invention relates to particles comprising a peroxy compound with capability of releasing hydrogen peroxide or peroxy acids in aqueous solutions and an amino acid of the formula (HOOC)$_2$N—C$_n$H$_m$COO—R in which R is H, CH$_2$OH, or CH$_3$, n is 1, 2 or 3 and m is 0-2n; or a salt thereof. The invention also relates to use of the particles and a composition comprising such particles.

19 Claims, No Drawings

BLEACHING AGENT

This application is a 371 of PCT/SE95/00960 filed Aug. 24, 1995.

The present invention relates to particles comprising a peroxy compound and an amino acid. The invention also relates to use of the particles and a composition containing such particles.

Powder detergent compositions often contain peroxy compounds as bleaching agents which release hydrogen peroxide or peroxy acids in aqueous solutions. However, many peroxy compounds are not storage stable. Their decomposition is supposed to be catalysed by metal cations moving comparatively freely through the water normally being present in detergents, but is also facilitated by the alkaline pH (normally from about 8 to about 12) and by other components commonly present in detergents, for example zeolites or bleaching activators such as TAED (tetraacetylethylene diamine), TAGU (tetraacetylglucoluril) or PAG (penta acetyl glucose).

In order to make environmental friendly detergents it is desirable to use alkali metal carbonate peroxy hydraite, commonly known as percarbonate, as a bleaching agent. However, the activity of percarbonate in a detergent decreases rapidly through decomposition if the detergent is stored at normal room temperature and humidity.

Many attempts to stabilize percarbonate have been done, for example by mixing or coating with stabilizing substances such as sulfates, carbonates, borates, silicates or organic substances. Such stabilizing methods are described in the patent literature, for example in GB 1466799, GB 1538893, GB 1575792, EP 459625, US 3975280 and EP 573731.

U.S. Pat. No. 5,362,412 discloses incorporating certain biodegradable amino compounds into detergent compositions in order to improve the bleaching. However, improvement of the storage stability of peroxy compounds is not dealt with.

WPI abstract 85-053698/09, abstract of JP-A-60011210, describes incorporation of aminoacids having less than two carboxyl groups and a polyphosphonic acid into percarbonalte.

The object of the present invention is to provide particles comprising a peroxy compound, particularly alkali metal percarbonate, with improved storage stability, particularly in detergent compositions. It is another object of the invention to provide particles comprising a peroxy compound only containing environmental friendly constituents.

Through the present invention, these objects has been fulfilled by providing particles comprising a peroxy compound with capability of releasing hydrogen peroxide or peroxy acids in aqueous solutions, the particles further comprising an amino acid of the formula:

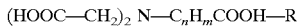

(HOOC—CH$_2$)$_2$ N—C$_n$H$_m$COOH—R in which R is H, CH$_2$OH or CH$_3$, n is 1, 2 or 3 and m is 0–2n; or a salt thereof.

Preferably n is 1 or 2 and most preferably m is n or 2n. In one preferred embodiment R is H, n is 2 and m is preferably 4. In another preferred embodiment R is CH$_2$OH or CH$_3$, n is 1 and m is 1. Particularly preferred amino acids are selected from β-alanine-N,N-diacetic acid, methylglycine N,N-diacetic acid, isoserine N,N-diacetic acid, or mixtures thereof.

The particles suitably comprises up to about 15% by weight, preferably up to about 10% by weight, most preferably up to about 5% by weight of amino acid(s) as described above or a salt thereof. The particles preferably comprise more than about 0.0% by weight, most preferably more than about 0.05% by weight of amino acid(s) as described above or a salt thereof. The amino acid may be mixed with the peroxy compound and/or be included in a coating.

It is assumed that the amino acid acts as a chelating agent, but it has surprisingly been found that the amino acids according to the invention gives better storage stability compared to conventional non-biodegradable chelating agents such a EDTA. Too high a concentration of amino acids or salts thereof may however decrease the thermal stability, particularly at high concentrations of the peroxy compounds.

It is preferred to use an alkali metal or an alkaline earth metal salt of the amino acid. Alkali metals are preferably selected from sodium, potassium or mixtures thereof, and alkaline earth metals are preferably selected from calcium, magnesium or mixtures thereof. Sodium salts are particularly preferred. In the following description of the invention, the term amino acid also refers to salts thereof.

The particles preferably contain silicate which further improves the stability and also enhances the mechanical strength. Silicate may be mixed with the peroxy compound and/or be included in a coating. Preferably at least some of the silicate is mixed with the peroxy compound. The silicate is suitably an alkali metal silicate, preferably of sodium, potassium or mixtures thereof, most preferably of sodium. The molar ratio SiO$_2$:M$_2$O, M being an alkali metal, is preferably from about 1 to about 3, most preferably from about 1 to about 2.5. The particles suitably contains from about 0.1 to about 20% by weight, preferably from about 0.2 to about 15% by weight, most preferably from about 0.5 to about 10% by weight of silicate expressed as sodium silicate.

It has been found that the stability is further improved if the particles contain a water soluble magnesium compound, preferably magnesium sulfate. The magnesium compound may be mixed with the peroxy compound and/or be included in a coating. Preferably at least some of the magnesium is mixed with the peroxy compound, most preferably in combination with alkali metal silicate. The particles preferably contains from about 0.01 to about 5% by weight, most preferably from about 0.1 to about 3% by weight of magnesium expressed as magnesium sulfate.

Particles according to the invention have high stability even if uncoated, but the highest stability is normally achieved if the particles are coated. Such a coating may for example contain one or more of amino acids as described herein, alkali metal silicate, water soluble magnesium compounds such as magnesium sulfate, alkali metal salts of carbonate, bicarbonate or sulfate, or environmental acceptable organic chelating agents, the different components being applied in one or several layers.

Suitably, the particles have an average diameter from about 50 to about 3000 μm, preferably from about 100 to about 1600 μm. The preferred density is from about 600 to about 1500 g/l, particularly from about 800 to about 1100 g/l. It has been found that a high density as well as a high average particle size improves the storage stability.

The invention is particularly advantageous if the peroxy compound is alkali metal percarbonate, but also other peroxy compounds can be stabilized, for example alkali metal salts of perborates, peroxysulfates, peroxyphosphates or peroxysilicates, peroxycarboxylic acids or peroxycarboxylic acid releasing compounds such as di-acylated di-peroxy carboxylic acids (see WO 91/17143).

Particles according to the invention can be prepared by conventional methods. Ingredients to be mixed with the peroxy compound are preferably added in a granulation step, but may also be included directly when, for example, alkali metal percarbonate is produced from alkali metal carbonate and hydrogen peroxide. If alkali metal silicate is to be included, it is preferably added in the form of an aqueous solution, and the amino acid or a salt thereof is then preferably mixed therein before addition to the peroxy compound. Granulation may be performed by conventional methods well known among those skilled in the art, such as compacting, extruding, agglomeration in drum or disk, fluid-bed granulation, prilling or in different kinds of mixers. An optional coating step may be performed by spraying the particles with preferably aqueous solutions of the components to be applied, for example in a drum or a fluid bed.

The invention further concerns use of the described particles comprising a peroxy compound and an amino acid as a bleaching agent, preferably in connection with washing of textiles or dishwashing. The washing water may be supplied with particles according to the invention being included in a detergent composition or being in the form of a separate bleaching powder. Preferably, the washing water is supplied with particles in an amount so to obtain from about 0.001 to about 1 gram active oxygen per liter, which for example corresponds to from about 0.01 to about 6 grams sodium percarbonate.

Finally, the invention concerns a composition containing an inert filler, and/or one or several substances active at washing, which composition further contains particles comprising a peroxy compound and an amino acid according to the invention, for example in an amount from about 1 up to about almost 100% by weight. The composition may comprise a mixture of particles containing different kinds of peroxy compounds. The substances active at washing may include detergent builders, surfactants, alkali generating substances, bleaching activators, enzymes, or any other substances commonly used in detergents. The detergent builder may for example be selected from phosphates such as tripolyphosphates, pyrophosphates or orthophosphates of alkali metals or ammonium, zeolites such as Zeolite A (e.g. Zeolite 4A), Zeolite B, Zeolite P, Zeolite X, or Zeolite HS, Zeolite MAP, silicates such crystalline layered disilicates (e.g. of the formula $NaMSI_{x+1} yH_2O$ wherein M is sodium or hydrogen, x is a number from 1.9 to 4 and y is a number from 0 to 20), amorphous disilicates (e.g. Britesil™), polycarboxylates, citrates, carbonates, bicarbonates, sesquicarbonates, sulfates, borates or mixtures thereof. The surfactants are preferably selected from anionic surfactants, nonionic surfactants, soaps or mixtures thereof. Anionic surfactants may for example be selected from linear alkylbenzene sulfonates, secondary alkane sulfonates, alphasulfonated methyl fatty acid esters, alkylsulfates, alcoholethoxysulfates, alpha-olefine sulfonates, alkali metal sarcosinates or alkyl ester sulfonates. Nonionic surfactants may for example be selected from alkoxylated compounds such as fatty alcohols, alkylphenols and alkylamines or from alkyl polyglucosides or polyhydroxy fatty acid amides. Soaps may for example be selected from sodium or potassium salts of tallow. Also cationic surfactants such as quaternary ammonium compounds or imide azolinium salts, as well as amphoteric surfactants might be used. Alkali generating substances may for example be selected from carbonates, silicates, phosphates or mixtures thereof. The bleaching activators may for example be selected from N- or O-acylated compounds such as TAED, TAGU, SNOBS (sodium nonoyl benzene sulfonate), PAG (penta acetyl glucose) or diacylated diperoxy carboxylic acids (see WO 91/17143). The filler may include any inert substance such as sodium sulfate. The composition may constitute a complete detergent or a bleaching powder to be added separately at washing. The enzymes may for example be selected from amylases, neutral and alkaline proteases, lipases, esterases or celluloses.

A complete detergent for washing of textiles suitably contains from about 1 to about 40% by weight, preferably from about 10 to about 30% by weight of particles according to the invention. Further, the detergent suitably contains a detergent builder, for example from about 5 to about 50% by weight, surfactants, for example from about 5 to about 35% by weight and an alkali generating substance, for example from about 5 to about 20% by weight. Preferably, the detergent contains from about 5 to about 20% by weight of anionic surfactants, from about 2 to about 15% by weight of nonionic surfactants, and from about 0.1 to about 5% by weight of soaps. The detergent may also contain bleaching activators, for example from about 1 to about 10% by weight, enzymes, for example from about 0.5 to about 2.5% by weight, and fillers such as sodium sulfate, for example from about 5 to about 50% by weight. It is also possible to include chelating agents such as phosphonates, EDTA, NTA (nitrilo triacetic acid), iminodiacetic acid derivatives or EDDS (ethylenediamine-N,N-disuccinic acid, for example in an amount from about 0.1 to about 1% by weight. Additionally, the detergent may contain conventional components such as water glass, carboxy methyl cellulose, dispersants such as homo or copolymers of polycarboxylic acids, foam regulators, antioxidants, perfumes, colouring agents, optical brighteners and water (normally from about 3 to about 15% by weight). The detergent can be prepared with conventional methods such as dry mixing, agglomeration or spray drying. If the preparation involves spray drying, any heat sensible component such as particles comprising peroxy compounds, enzymes and perfumes should be added to the dried material.

A separate bleaching powder may comprise up to almost 100% by weight of particles containing peroxy compounds according to the invention, but preferably the content is from about 5 to about 90% by weight. The bleaching powder may comprise only one peroxy compound or a mixture of particles containing different kinds of peroxy compounds. It is advantageous if a hydrogen peroxide generating substance such as percarbonate, for example from about 10 to about 75% by weight, is used in combination with a bleaching activator such as TAED or TAGU, for example from about 2 to about 25% by weight. Also other bleaching activators such as a diacylated dipercarboxylic acid may be used, for example in an amount from about 2 to about 25% by weight. A bleaching powder may also contain detergent builders, for example from about 5 to about 90% by weight, surfactants, for example up to about 10% by weight, enzymes, for example up to about 2% by weight, or fillers, for example from about 5 to about 90% by weight. A preferred bleaching powder consists essentially of from about 30 to about 75% by weight of particles containing percarbonate, from about 10 to about 25% by weight of a bleaching activator, the balance preferably substantially being detergent builders, fillers, surfactants, water or mixtures thereof.

A detergent for dishwashing may be in the form of a low alkaline detergent (pH of washing water intended to be about 10–11) suitably containing from about 2 to about 15% by weight of a bleaching agent comprising particles according to the invention, from about 5 to about 50% by weight of alkali metal disilicate, from 0 to about 40% by weight of alkali metal carbonate, from about 15 to about 50% by weight of builders such as sodium citrate and polycarboxylates or sodium tri polyphosphate (STPP), from about 0.5 to about 5% by weight of low foaming nonionic surfactants, from about 0.5 to about 5% by weight of enzymes and from about 1 to about 6% by weight of bleaching activators such as TAED. A dishwasher detergent may also be high alkaline (pH of washing water intended to be about 11–12) having a similar composition as the low alkaline detergent, the disilicate however being replaced with from about 20 to about 80% by weight of alkali metal metasilicate and the builder preferably substantially consisting of STPP.

The present invention makes it possible to prepare stable bleaching agents comprising peroxy compounds, particularly percarbonate, which may be used in detergents including zeolites such as zeolite 4A. The invention also makes it possible to decrease or exclude the use of for example EDTAL or phosphonates which are less suitable from an environmental point of view.

The invention will now be described through the following examples which, however, not are intended to limit the scope of the invention. If not otherwise stated, all contents and percentages refer to content and percent by weight based on the entire particle.

EXAMPLE 1

Sodium percarbonate particles with a diameter of about 315–1250 μm and a density of about 900 g/l were prepared by granulating fine percarbonate particles in a rotating Eirich drum together with different additives supplied as aqueous solutions and drying the granules in a fluidized bed. In order to test the storage stability of the percarbonate, the prepared particles as well as reference particles of pure sodium percarbonate were included in a standard detergent IEC-Z (Henkel) consisting of 9.7% linear alkyl benzenesulfonate ($C_{average}$11.5), 5.2% ethoxylated $C_{12-18}$alcohol ($EO_7$), 3.6% sodium-soap, 32.5% zeolite 4A, 11.8% sodium carbonate, 5.2% sodium salt of copolymerisate of acrylic- and maleic acid (Sokolan $CP_5$), 3.4% sodium waterglass (ratio 3.3), 1.3% carboxy methyl cellulose, 0.3% EDTA, 0.3% optical brightener (stilbene type), 7.4% sodium sulfate, 12.2% water, 6.5% foam inhibitor (SIK), 0.5% enzyme prills protease (activity 300.00). Samples were prepared from 64 grams IEC-Z, 12 grams percarbonate particles and 4 grams TAED. A Quick Stability Index (QSI) was determined for each sample by measuring the amount of oxygen formed during 24 hours storage at 40° C. and dividing the amount oxygen liberated by the relative content (%) of active oxygen in the original percarbonate. Thus, a low QSI-value means high stability. The results appear in the table below, in which the contents of the different constituents refer to a by weight based on the entire particle. The following abbreviations are used: SPC=sodium percarbonate; β-ADA=β-alanine-N,N-diacetic acid; SDS=sodium disilicate; AO active oxygen; QSI=quick stability index.

| SPC | β-ADA | SDS | AO | QSI |
|---|---|---|---|---|
| 100% | — | — | 14.5% | 5.7 |
| 98% | 2% | — | 14.3% | 2.7 |
| 97.2% | 2% | 0.8% | 14.4% | 1.87 |

EXAMPLE 2

Sodium percarbonate particles with a diameter of about 315–1250 μm and a density of about 900 g/l were prepared by granulation from fine percarbonate particles together with sodium salt of β-alanine-N,N-diacetic acid, sodium disilicate and magnesium sulfate supplied as aqueous solutions. The granulation was performed by extruding a mixture of the ingredients, crushing the string formed, rounding the particles obtained on a rotating disk, drying and sieving the rounded particles. For comparative purposes one sample was prepared without β-alanine-N,N-diacetic acid and one sample was prepared with EDTA instead of β-alanine-N,N-diacetic acid. The stability was tested in IEC-Z detergent as in Example 1 and the results appear in the table below.

| SPC | β-ADA | EDTA | SDS | $MgSO_4$ | AO | QSI |
|---|---|---|---|---|---|---|
| 99.2% | — | — | 0.67% | 0.12% | 14.3% | 3.4 |
| 99.0% | — | 0.2% | 0.67% | 0.12% | 14.4% | 3.1 |
| 99.0% | 0.2% | — | 0.67% | 0.12% | 14.4% | 3.0 |
| 98.7% | 0.5% | — | 0.67% | 0.12% | 14.4% | 2.3 |

EXAMPLE 3

Sodium percarbonate particles with a diameter of about 315–1250 μm were coated in a rotating drum by spraying with aqueous solutions of different additives. The stability was tested in IEC-Z detergent as in Example 1. The results appear in the table below. ISDA refers to isosibrine N,N-diacetic acid.

| SPC | β-ADA | ISDA | EDTA | SDS | $MgSO_4$ | AO | QSI |
|---|---|---|---|---|---|---|---|
| 95.0% | 5.0% | — | — | — | — | 13.9% | 0.5 |
| 95.0% | — | 5.0% | — | — | — | 14.9% | 1.2 |
| 95.5% | 1.5% | — | — | 2.00% | 1.00% | 13.8% | 1.1 |
| 95.5% | — | — | 1.5% | 2.00% | 1.00% | 13.8% | 1.5 |

EXAMPLE 4

Sodium percarbonate particles with a diameter of about 315–1250 μm and a density of about 900 g/l were prepared by granulation from fine percarbonate particles together with 1% sodium glucoheptonate, 1% sodium disilicate and 0.12% magnesium sulfate supplied as aqueous solutions. The granulation was performed by extruding a mixture of the ingredients, crushing the string formed, rounding the particles obtained on a rotating disk and drying and sieving the rounded particles. The particles obtained were coated by sprarinng aqueous solutions in a fluidized bed with 2% sodium silicate ($SiO_2$:$Na_2O$ ratio 1), 1.4% magnesium sulfate, 10% sodium bicarbonate and 0.5% β-alanine-N,N-diacetic acid. The coated particles contained 12.7% active oxygen. The stability of the particles was tested in IEC-Z detergent as in Example 1 and it was found that QSI was 0.

What is claimed is:

1. Particles comprising a peroxy compound with capability of releasing hydrogen peroxide or peroxy acids in aqueous solution, wherein the said particles also comprise an amino acid of the formula:

(HOOC—$CH_2$)$_2$N—$C_nH_m$COO—R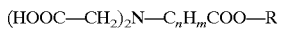

in which R is H, $CH_2OH$, or $CH_3$, n is 1, 2 or 3 and m is 0 to 2n; or a salt thereof, and wherein the said amino acid or salt thereof is throughly admixed with said peroxy compound prior to forming the said particles from said admixture.

2. Particles as claimed in claim 1, wherein the amino acid is selected from the group consisting of β-alanine-N,N- diacetic acid, methylglycine N,N-diacetic acid, isoserine N,N-diacetic acid, and mixtures thereof.

3. Particles as claimed in claim 1, wherein the amino acid is β-alanine-N,N-diacetic acid.

4. Particles as claimed in claim 1, wherein the particles comprise an amino acid salt, and wherein the amino acid salt is mixed with the peroxy compound.

5. Particles as claimed in claim 1, wherein the particles comprise an amino acid salt, and wherein the amino acid salt is further included in a coating on said particles.

6. Particles as claimed in claim 1, wherein the particles comprise a magnesium compound.

7. Particles as claimed in claim 1, wherein the peroxy compound is alkali metal percarbonate.

8. A method for bleaching an article, comprising contacting the article with an aqueous solution of particles as claimed in claim 1.

9. Composition comprising an inert filler and at least one substance active at washing, which composition further comprises particles according to claim 1.

10. Particles as claimed in claim 1, wherein the amount of amino acid or salt thereof in the particles is from about 0.01 to about 15% by weight.

11. Detergent composition comprising particles according to claim 1.

12. Detergent composition as claimed in claim 11, comprising zeolite as a builder.

13. Particles as claimed in claim 1, wherein said amino acid is selected from the group consisting of β-alanine-N,N-diacetic acid, isoserine N,N-diacetic acid, an amino acid of the formula $(HOOC-CH_2)_2N-C_2H_m COOR$ wherein R is $CH_2OH$ or $CH_3$, n is 1 and m is 1, salts thereof and mixtures thereof.

14. Particles as claimed in claim 13, wherein the amount of amino acid or salt thereof in the particles is from about 0.01 to about 15% by weight.

15. Particles as claimed in claim 1, wherein the particles comprise silicate.

16. Particles as claimed in claim 15, wherein the particles comprise alkali metal silicate.

17. Particles as claimed in claim 15, wherein the silicate is mixed with the peroxy compound.

18. Particles as claimed in claim 15, wherein silicate is included in a coating.

19. Particles comprising a peroxy compound with capability of releasing hydrogen peroxide or peroxy acids in aqueous solution, wherein the said particles also comprise a salt of β-alanine-N,N-diacetic acid and wherein the said amino acid salt is throughly admixed with the said peroxy compound prior to forming the said particles from said admixture and wherein the said amino acid salt is also included in a coating on said particles.

* * * * *